US011196673B2

(12) United States Patent
Premji et al.

(10) Patent No.: US 11,196,673 B2
(45) Date of Patent: Dec. 7, 2021

(54) TRAFFIC SHAPING OVER MULTIPLE HOPS IN A NETWORK (71) Applicant: Arista Networks, Inc., Santa Clara, CA (US)

(72) Inventors: Ariff Premji, Redmond, WA (US); Manikandan Arumugam, Sunnyvale, CA (US); Urvish Mukundbhai Panchal, Redmond, WA (US)

(73) Assignee: Arista Networks, Inc., Santa Clara, CA (US)

(*) Notice: Subject to any disclaimer, the term of this patent is extended or adjusted under 35 U.S.C. 154(b) by 323 days.

(21) Appl. No.: 16/514,900

(22) Filed: Jul. 17, 2019

(65) Prior Publication Data

US 2021/0021527 A1 Jan. 21, 2021

(51) Int. Cl.
*H04L 12/815* (2013.01)
*H04L 12/741* (2013.01)
*H04L 12/801* (2013.01)
*H04L 12/835* (2013.01)

(52) U.S. Cl.
CPC ............. *H04L 47/225* (2013.01); *H04L 45/74* (2013.01); *H04L 47/17* (2013.01); *H04L 47/30* (2013.01)

(58) Field of Classification Search
CPC ....... H04L 45/74; H04L 47/17; H04L 47/225; H04L 47/30
See application file for complete search history.

(56) References Cited

U.S. PATENT DOCUMENTS

| 2016/0094450 | A1* | 3/2016 | Ghanwani | ............... | H04L 47/22 370/235 |
| 2016/0205023 | A1* | 7/2016 | Janardhanan | ........... | H04L 47/22 370/230.1 |

\* cited by examiner

*Primary Examiner* — Brian P Cox
(74) *Attorney, Agent, or Firm* — Fountainhead Law Group P.C.

(57) ABSTRACT

A first network device receives a message from a second network device with an indication that the first network device is to adjust a data rate of data being received by the first network device. The first network device includes a first buffer space that is greater than a second buffer space of the second network device. The first network device determines a set of computing devices connected to the second network device based on receiving the indication and defines a set of first data rates to use to send data to respective computing devices. The first network device adjusts a second data rate of received data to send the received data through the second network device to a computing device at a first data rate defined in the set of first data rates. The first network device uses the first buffer space to perform the adjusting.

20 Claims, 7 Drawing Sheets

TRAFFIC SHAPING OVER MULTIPLE HOPS IN A NETWORK

BACKGROUND

A data center may use a network topology that connects an external network to servers in the data center. One network topology is a leaf-spine architecture. A spine layer may include switches that are connected to the external network and also connected to the leaf layer. The leaf layer includes leaf layer switches that connect to servers, which are running applications.

Some applications may require traffic shaping from the leaf layer to the server. However, the switches at the leaf layer often include an insufficient amount of buffer space to perform the required traffic shaping. For example, if traffic shaping should be performed from 10 gigabits per second (Gbps) to 1 Gbps, a leaf layer switch would have to buffer a large amount of data to perform the traffic shaping. However, the available buffer space at a leaf layer switch may not be adequate, which may result in packets being dropped due to buffer overrun.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

Described herein are techniques for a networking system. In the following description, for purposes of explanation, numerous examples and specific details are set forth in order to provide a thorough understanding of some embodiments. Some embodiments as defined by the claims may include some or all of the features in these examples alone or in combination with other features described below, and may further include modifications and equivalents of the features and concepts described herein.

A network topology may include a first layer, a second layer, and a third layer. The first layer is connected to an external network and also connected to the second layer. The second layer is connected to computing devices (e.g., servers) in the third layer. For example, the first level may be a spine layer and a second layer is a leaf layer. The spine layer may include spine switches that are connected to leaf switches in a mesh. Also, the computing devices may be servers that are hosting applications that are accessed by clients from the external network.

An application running on a server may require traffic-shaping from the leaf-spine network to the servers running the application. Traffic shaping involves receiving data, such as at a first data rate (e.g., 10 Gbps), and shaping the data to another data rate, such as a lower rate (e.g., 1 Gbps). The device performing the traffic shaping needs to buffer some of the data that is being received before sending the data at the lower data rate. The smaller buffers at the leaf level may not have the buffer space to perform traffic shaping for the application. However, the spine switches may include more buffer space that allow the spine layer to perform traffic shaping for the application.

The servers may be connected in subnets in the third layer. Some embodiments use a protocol, such as Border Gateway Protocol (BGP), to advertise subnets that are connected to the leaf layer. The spine switches can then create server-specific traffic shapers for each server configuration in the subnets and perform traffic shaping at the spine layer. The traffic shaping is performed at least two hops away from the servers. However, the data rate of sending the traffic-shaped data from the spine layer to the servers via the leaf layer is similar and does not affect the data rate of data received at the applications running on the servers. Thus, some embodiments leverage the large buffer space in the spine switches and perform the traffic shaping there instead of at the leaf switches.

System Overview

Figure 1:
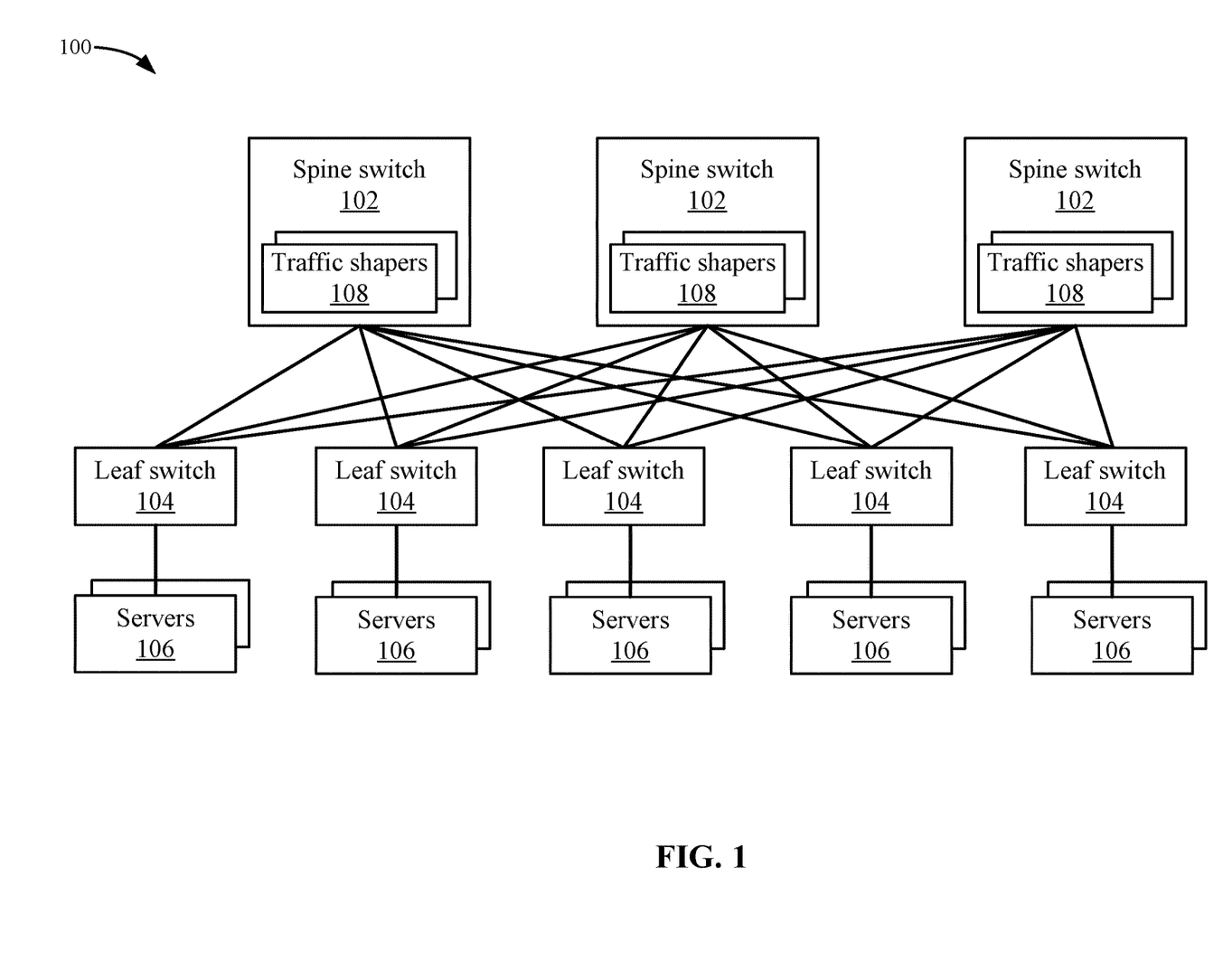
FIG. 1 depicts a simplified system of a network according to some embodiments.

FIG. 1 depicts a simplified system 100 of a network according to some embodiments. System 100 includes a spine layer, a leaf layer, and a server layer. The spine layer includes spine network devices, which may be switches, routers, or other devices that can send data traffic, and the leaf layer includes leaf network devices, that may also include switches, routers or other devices that can send data traffic. For discussion purposes, spine switches 102 and leaf switches 104 will be used. Servers 106 may be computing devices that run applications.

Spine switches 102 and leaf switches 104 form a leaf-spine network. Each spine switch 102 may be interconnected with each leaf switch 104. Data flows in network 100 take the same number of hops regardless of the source and destination. This means that data flowing from spine switch 102 to any server 106 takes the same number of hops and theoretically is transferred at around the same data rate at each hop.

A client (not shown) in an external network to network 100 may be accessing an application running on a server 106 through the leaf-spine network. The application running on server 106 may require traffic shaping, such as data from the external network being sent through the spine layer and leaf layer to the application in server 106 should be traffic shaped from a first data rate to a second data rate, such as from 10 Gbps to 1 Gbps.

To perform the traffic shaping, spine switches 102 instantiate traffic shapers 108 to shape data that is received from clients at the spine layer to the desired data rate for the application. A traffic shaper 108 is a structure that is used to determine how to shape data for a server 106. In some embodiments, traffic shaper 108 may identify one or more servers 106 and a data rate in which to send data to the one or more servers. Traffic shapers 108 are at least two hops away from the applications running in servers 106. However, spine switches 102 typically include more buffer space than leaf switches 104. Accordingly, spine switches 102 can perform the required traffic shaping using the available buffer space more efficiently than leaf switches 104. Performing the traffic shaping at least two hops away from the servers may still provide data to the applications running on servers 106 at a stable data rate that is required because the data rate between traffic shapers 108 and applications running on servers 106 is stable in the leaf-spine network. That is, the spine leaf layer topology provides data in a substantially similar data rate via any connection between spine switches 102 and leaf switches 104 to servers 106.

Figure 2:
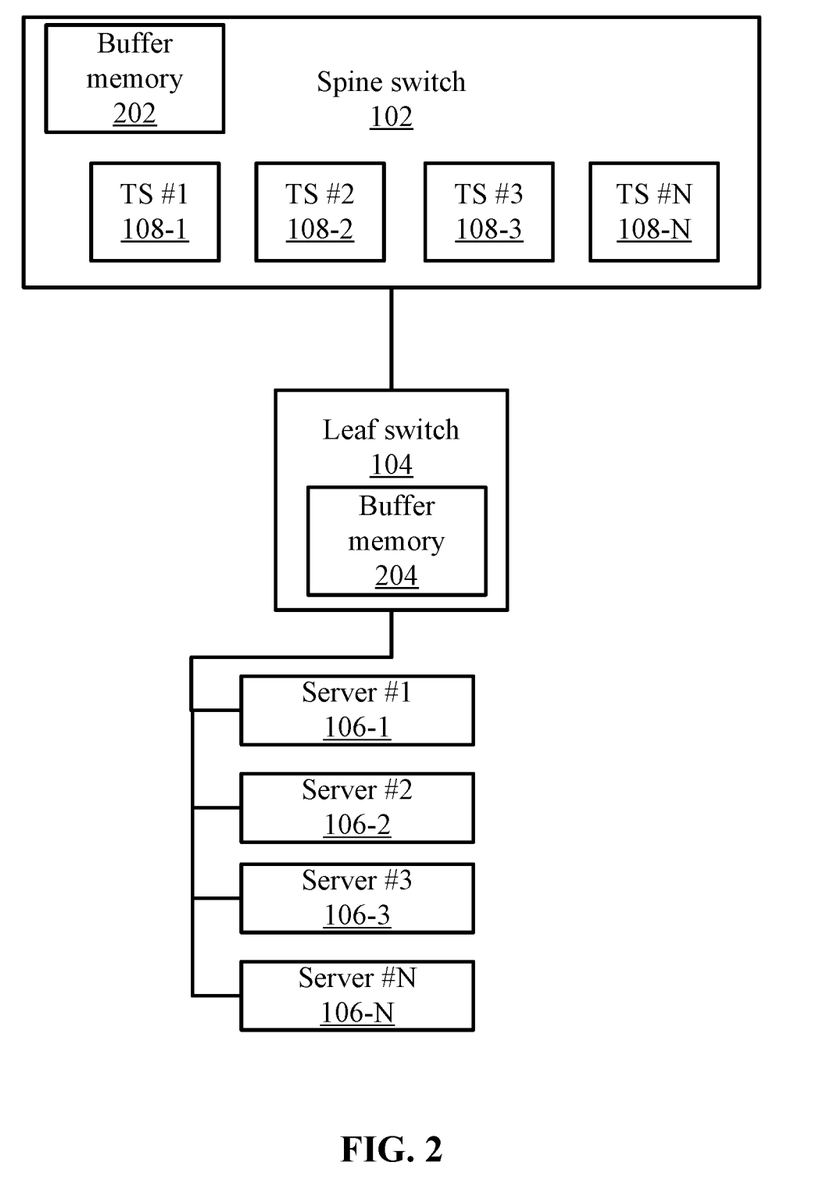
FIG. 2 depicts a more detailed example of a spine switch and a leaf switch according to some embodiments.

FIG. 2 depicts a more detailed example of a spine switch 102 and a leaf switch 104 according to some embodiments. Spine switch 102 includes buffer memory 202 and leaf switch 104 includes buffer memory 204. As discussed above, buffer memory 204 in leaf switch 104 may include less available memory space than buffer memory 202 in spine switch 102. In some examples, buffer memory 202 may include orders of magnitude more buffer memory than buffer memory 204, such as four GBs of buffer memory in buffer memory 202 vs. 10-20 MBs of memory for buffer memory 204.

Leaf switch 104 may be connected to servers 106, which may include server #1 106-1 to server #N 106-N. In some embodiments, server #1 106-1 to server #N 106-N may be part of a server subnet that is hosting multiple instances of an application. In some embodiments, a top-of-the-rack switch may connect servers 106 to leaf switch 104 where the top-of-the-rack switch may be a switch for a server subnet that may include a number of possible servers. For example, a/26 server subnet may possibly include 62 servers while a/24 server subnet may possibly include around 253 servers in the subnet (because not all IP addresses may be used for servers). Although 253 servers are described, another number of servers may be used.

Spine switch 102 may instantiate traffic shapers (TS) #1 108-1 to TS #N 108-N for each server #1 106-1 to server #N 106-N. In some embodiments, traffic shapers 108 may be created per server 106 in the subnet. The number of traffic shapers 108 may be equal to the number of servers 106 that exist in the subnet or the number of traffic shapers 108 may be equal to the number of possible servers 106 regardless of how many servers 106 have been instantiated and are connected to leaf switch 104. Also, spine switch 102 may be coupled to multiple leaf switches 104 and thus may instantiate traffic shapers 108 for each leaf switch in which spine switch 102 is connected. That is, spine switch 102 instantiates traffic shapers for subnets connected to other leaf switches 104 (not shown). In some embodiments, spine switch 102 may have enough buffer memory 202 to perform traffic shaping for each leaf switch 104 in the leaf layer.

The following will now describe the configuration of traffic shapers and then the traffic shaping in more detail.

Traffic Shaper Configuration

Figure 3:
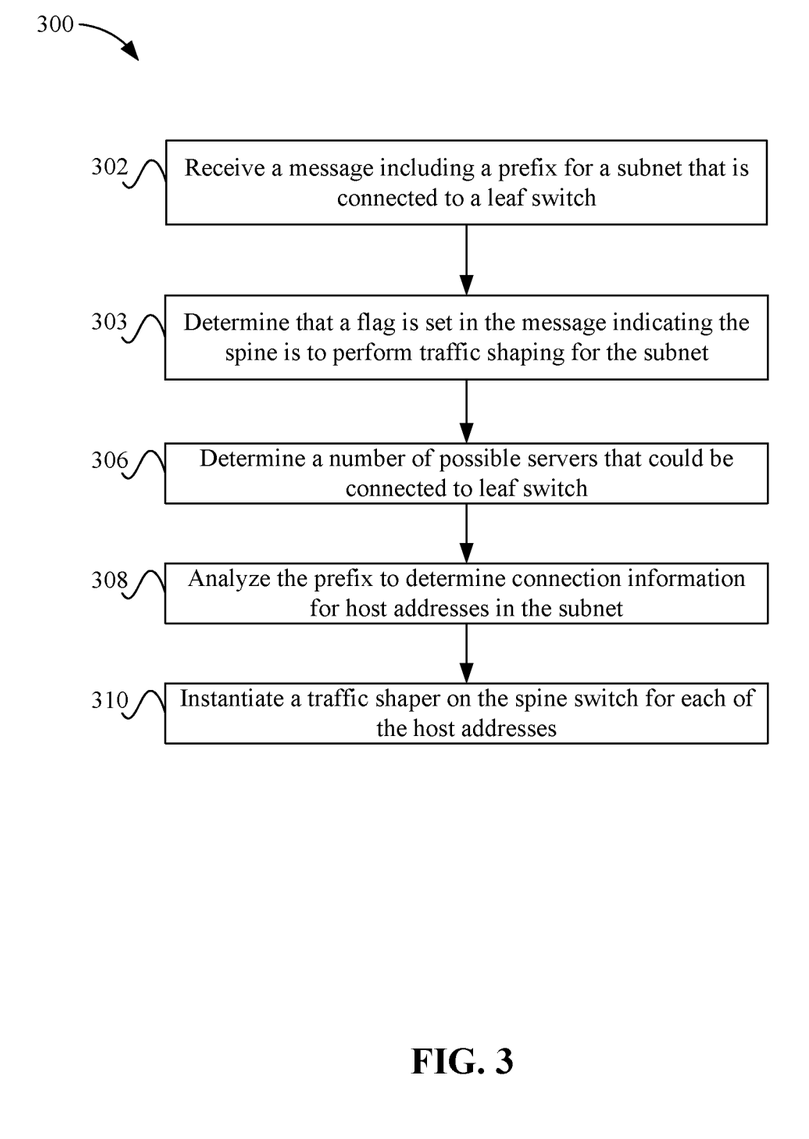
FIG. 3 depicts a simplified flowchart of a method for configuring traffic shapers on spine switches according to some embodiments.

FIG. 3 depicts a simplified flowchart 300 of a method for configuring traffic shapers 108 on spine switches 102 according to some embodiments. At 302, spine switch 102 receives a message that includes connection information, such as a prefix for a subnet that is connected to a leaf switch 104. The message may be advertising the subnet connectivity to spine switch 102. The prefix may be an address that is followed by a bit length of the prefix. For example, a prefix may be 198.51.100.0/24, which allocates 24 bits to the network prefix where addresses in the range 198.51.100.0 to 198.51.100.255 belong to this subnet, which means 253 servers may belong to the subnet. Servers may advertise connectivity to both leaf switches 104 and spine switches 102 such that these switches can forward data traffic to applications running on the servers. Other subnet sizes and different protocols may also be used to advertise connectivity.

At 304, spine switch 102 determines that a flag is set in the message indicating that spine switch 102 is to perform traffic shaping for the subnet. In some embodiments, leaf switch 104 may perform traffic shaping and the flag may not be set in the message. In this alternate example, the message would be used to advertise the subnet to spine switch 102, but not indicate traffic shaping should be performed by spine switch 102. However, it is assumed in this example that traffic shaping should be performed by spine switch 102.

At 306, spine switch 102 determines a number of possible servers 106 that could be connected to leaf switch 104. As discussed above, the prefix may indicate the address range for the subnet and in some examples, 253 servers may belong to the subnet according to the prefix used above.

At 308, spine switch 102 analyzes the prefix to determine connection information for server addresses in the subnet. For example, as discussed above, servers 106 may use the addresses in a range associated with the prefix.

At 310, spine switch 102 instantiates a traffic shaper 108 for each of the server addresses. For example, each traffic shaper 108 may be assigned a server address.

Traffic Shaping

After instantiating traffic shapers 108 on spine switches 102, spine switches 102 may perform traffic shaping. In some embodiments, a client may send data via an external network to an application running on a server 106. Spine switch 102 first receives the data, and that data is sent at a first data rate, such as 10 Gbps.

Figure 4:
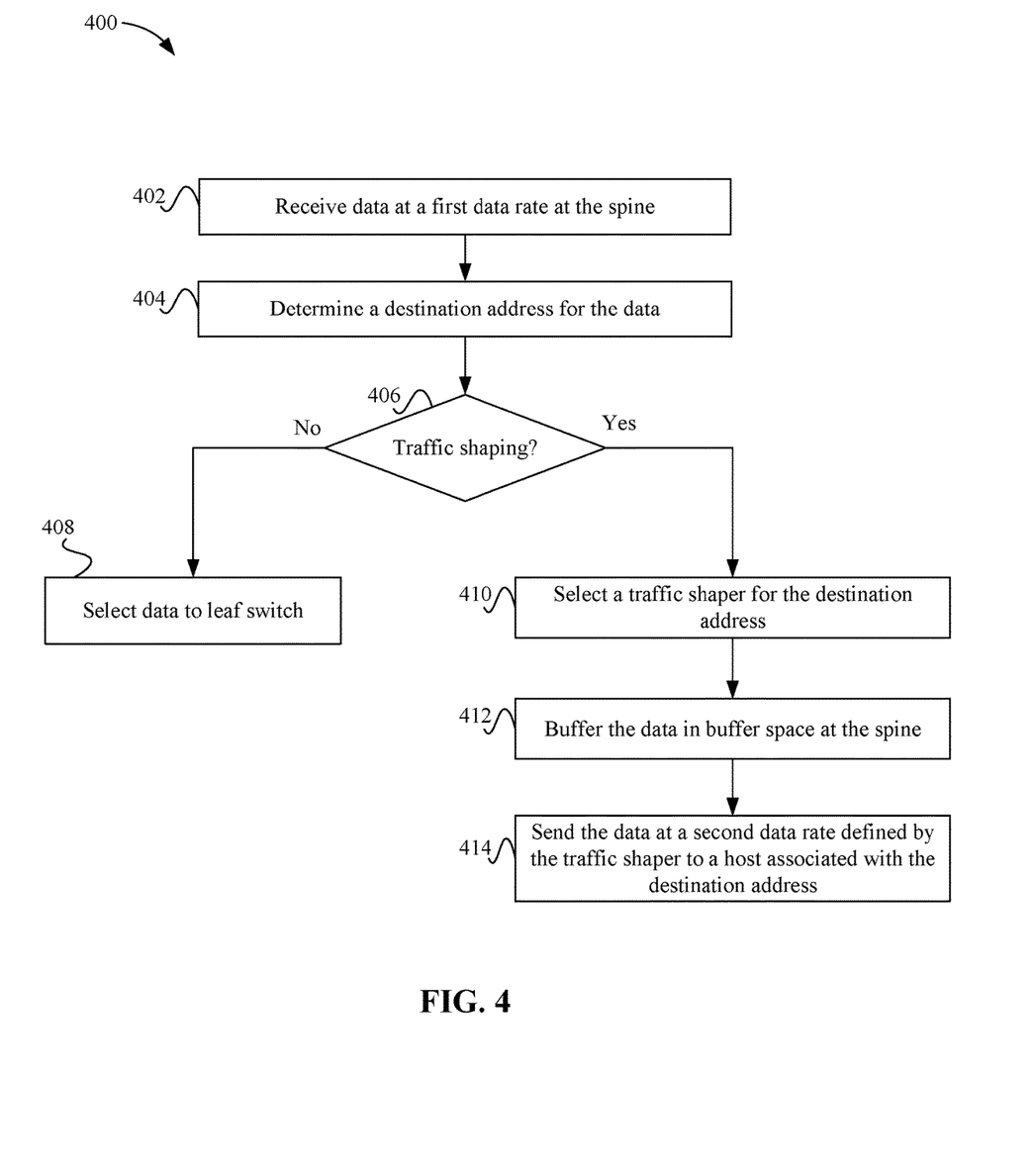
FIG. 4 depicts a simplified flowchart of a method for performing traffic shaping at the spine switch according to some embodiments.

FIG. 4 depicts a simplified flowchart 400 of a method for performing traffic shaping at spine switch 102 according to some embodiments. At 402, spine switch 102 receives data at a first data rate, such as 10 Gbps. Then, at 404, spine switch 102 determines a destination address for the data. In some embodiments, the destination address is for a server. The destination address may also be for other entities, such as workloads running the application.

At 406, spine switch 102 determines whether traffic shaping should be performed. For example, some data may not be traffic shaped. If traffic shaping is not going to be performed at the spine layer, at 408, spine switch 102 sends the data to a leaf switch 104 without performing traffic shaping.

If traffic shaping is to be performed, at 410, spine switch 102 selects a traffic shaper 108 for the destination address. For example, traffic shapers 108 may have associated destination addresses. Spine switch 102 determines a traffic shaper 108 that was instantiated with the destination address. At 412, spine switch 102 buffers data in buffer memory 202 at spine switch 102. For example, data is being received at 10 Gbps and buffered in buffer memory 202 of spine switch 102. Then, at 514, spine switch 102 sends the data at a second data rate defined by traffic shaper 108 to a server 106 that is associated with the destination address.

For example, spine switch 102 may remove the buffered data at 1 Gbps, and send the data to server 106 via a leaf switch 104.

Figure 5:
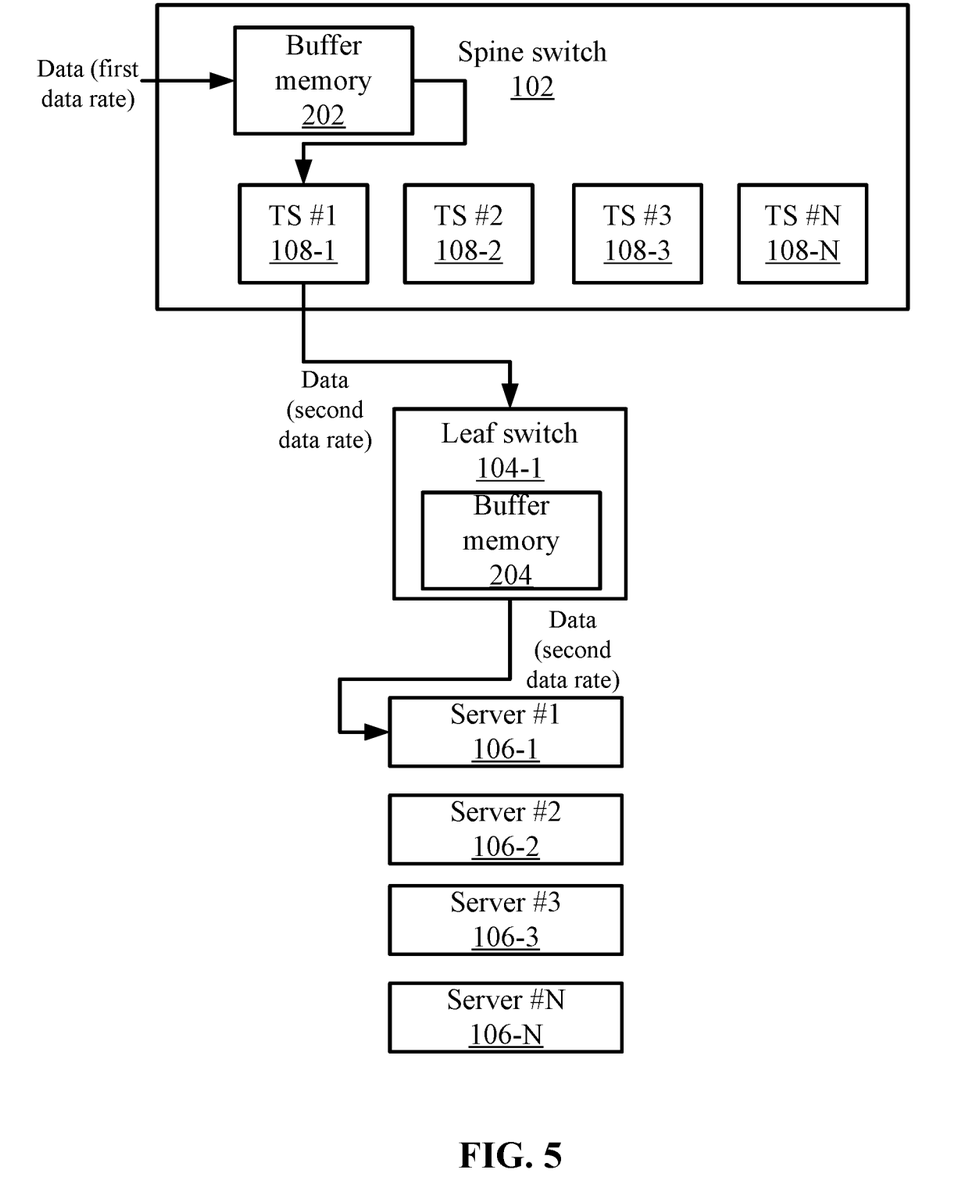
FIG. 5 depicts an example of the traffic shaping in the system according to some embodiments.

FIG. 5 depicts an example of performing the traffic shaping in system 100 according to some embodiments. Spine switch 102 receives data at a first data rate that is directed to a destination address. Buffer memory 202 buffers the data. Once spine switch 102 selects a traffic shaper, such as traffic shaper #1 108-1, spine switch 102 removes data from buffer memory 202 to be sent to a server #1 106-1. For example, data associated with the destination address is sent to a traffic shaper #1 108-1, which was instantiated for that destination address. Spine switch 102 may determine the second data rate for traffic shaper #1 108-1. Then, spine switch 102 removes data from buffer memory 202 at the second data rate specified by traffic shaper #1 108-1.

A leaf switch 104 receives the data at the second data rate and can buffer the data in buffer memory 204. The data is sent at the second data rate, which is a lower data rate than the first data rate, and leaf switch 104 can buffer the data in buffer memory 204 without overrunning the buffer memory. Then, leaf switch 104 sends the data from buffer memory 204 to server #1 106-1.

In some embodiments, the path taken from spine switch 102 to server #1 106-1 may be the same path for a client to the application running on server #1 106-1. For example, load balancing algorithms may be used such that the same path is selected for a client that is sending data to an application.

Even though traffic shaper #1 108-1 is two hops away from server #1 106-1, the data sent between spine switch 102 and leaf switch 104, and from leaf switch 104 to server #1 106-1 may be stable. Accordingly, data sent from spine switch 102 at the second data rate may still be sent from leaf switch 104 to server #1 106-1 at a substantially similar data rate. Accordingly, performing traffic shaping at spine switch 102 does not affect the data rate of data received at server #1 106-1. However, the larger buffer space at spine switch 102 allows the traffic shaping to be performed with overrunning buffer space at either spine switch 102 and leaf switch 104. Leaf switch 104 does not experience buffer overruns because leaf switch 104 receives the data at the second data rate, which is slower than the first data rate.

Figure 6:
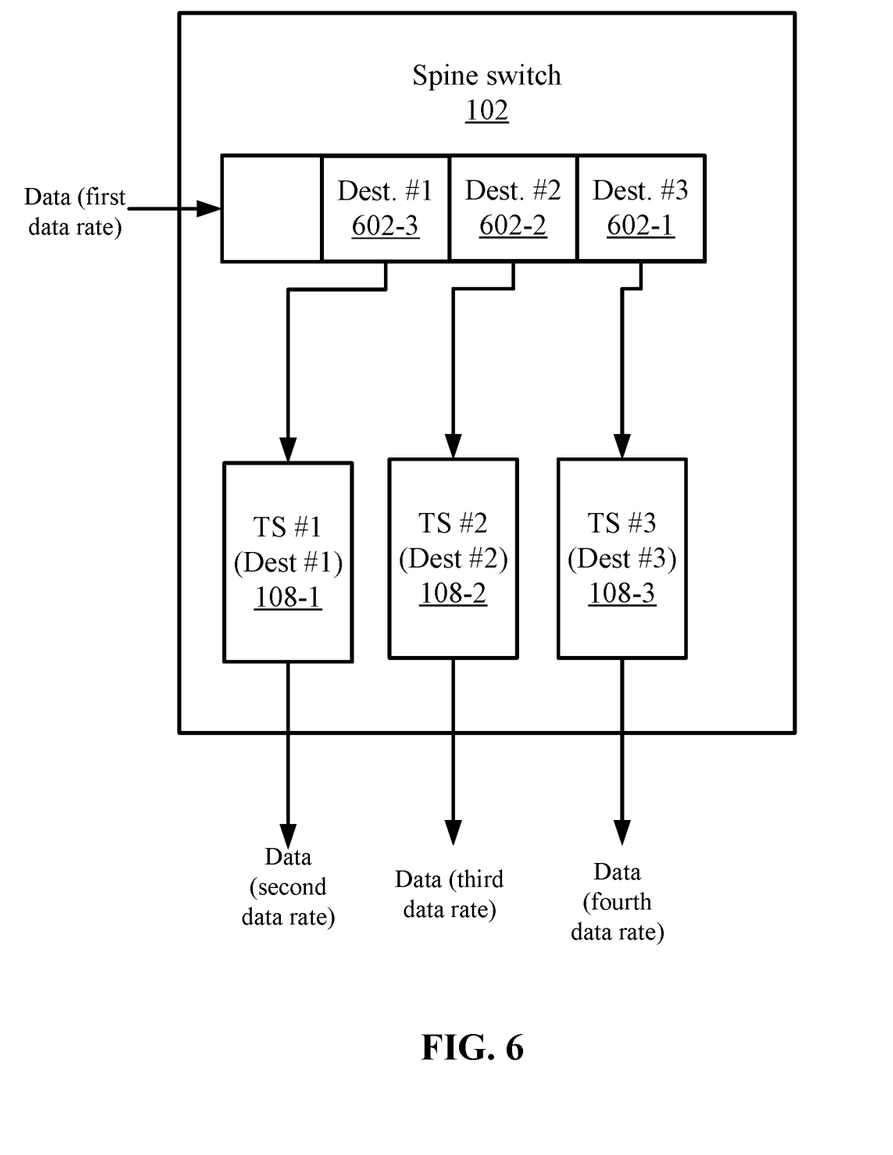
FIG. 6 depicts an example of performing the traffic shaping for multiple destinations in the system according to some embodiments.

Spine switch 102 may be sending data to multiple destinations. FIG. 6 depicts an example of the traffic shaping for multiple destinations in system 100 according to some embodiments. Spine switch 102 receives data at a first data rate, which may be multiple packets that are buffered in buffer memory 202. Each packet may be associated with a destination address, which spine switch 102 inspects in a header of the packet. Spine switch 102 then selects a traffic shaper associated with the destination address. For example, spine switch 102 may use a table that lists traffic shapers 108 and associated destination addresses. Spine switch 102 looks up a spine switch for the destination address in the table.

In some examples, a packet #1 602-1 is directed to a destination (Dest.) #3. Spine switch 102 selects traffic shaper #3 108-3, which is associated with destination #3, and sends packet #1 602-1 to traffic shaper #3 108-3. Traffic shaper #3 108-3 sends packet #1 at a fourth data rate. A packet #2 602-2 is directed to a destination (Dest.) #2. Spine switch 102 selects traffic shaper #2 108-2, which is associated with destination #2, and sends packet #2 602-2 to traffic shaper #2 108-2. Traffic shaper #2 108-2 sends packet #2 at a third data rate. Spine switch 102 processes packet #3 602-3 similarly and sends the packet to traffic shaper #1, which sends the packet at a second data rate. The first data rate is different from the second data rate, the third data rate, and the fourth data rate. Also, the second data rate, the third data rate, and the fourth data rate may be different or similar. However, the second data rate, the third data rate, and the fourth data rate may be all less than the first data rate.

CONCLUSION

Accordingly, traffic shaping is moved at least two hops away from applications running on servers. This leverages the increased amount of buffer space in the spine switches and improves the forwarding of packets to the applications.

Further Examples

In some embodiments, a method for performing traffic shaping includes: receiving, by a first network device, a message from a second network device with an indication that the first network device is to adjust a data rate of data being received by the first network device, wherein the first network device includes a first buffer space that is greater than a second buffer space of the second network device; determining, by the first network device, a set of computing devices connected to the second network device based on receiving the indication; defining, by the first network device, a set of first data rates to use to send data to respective computing devices in the set of computing devices; and adjusting, by the first network device, a second data rate of received data to send the received data through the second network device to a computing device in the set of computing devices at a first data rate defined in the set of first data rates, wherein the first network device uses the first buffer space to perform the adjusting.

In some embodiments, each of the set of computing devices is associated with a first data rate in the set of first data rates, and the first data rate is selected based on data being sent to a respective computing device in the set of computing devices.

In some embodiments, receiving the message includes: receiving connection information for the set of computing devices; and using the connection information to define a respective first data rate to send data to each of the set of computing devices.

In some embodiments, receiving the message includes: receiving connection information for a subnet; determining a number of computing devices in the subnet based on the connection information; and using the number of computing devices to define a first data rate to send data to each of the set of computing devices.

In some embodiments, the connection information for the subnet is a prefix of the subnet; and the prefix is used to define a first data rate to send data to each of the set of computing devices with connection information for each of the set of computing device.

In some embodiments, the set of computing devices are at least a first hop away from the second network device and are at least a second hop away from the adjusting of the first data rate of received data that is being performed on the first network device.

In some embodiments, defining the set of first data rates includes: determining a set of destination addresses for the set of computing devices; and associating the set of destination addresses with the set of first data rates, wherein each first data rate is associated with a destination address.

In some embodiments, the first network device is included in a set of first network devices, the second network device is included in a set of second network devices, and the set of first network devices and the set of second network devices are interconnected in a network, wherein a data rate of sending data from the set of first network devices to the set of second devices via the network is similar.

In some embodiments, the set of first network devices and the set of second network devices form a leaf-spine network in which the set of first network devices and the set of second network devices are connected in a mesh.

In some embodiments, adjusting the second data rate of the received data includes: receiving the data at the second data rate for a computing device in the set of computing devices; selecting first data rate for the computing device; and sending the data to the computing device through the second network device at first data rate.

In some embodiments, adjusting the second data rate of the received data comprises: buffering at least part of the data in the first buffer space until sending the at least the part of the data at the first data rate to the computing device in the set of computing devices.

In some embodiments, adjusting the second data rate of the received data includes: inspecting a packet of the data for a destination address; and selecting the first data rate in the set of first data rates that is defined for the destination address.

In some embodiments, the first network device comprises a first switch with the first buffer space, the second network device comprises a second switch with the second buffer space, and the set of computing devices comprise a set of servers that are running an application.

In some embodiments, data is received from a client that sends the data for an application that is running on the computing device in the set of computing devices.

In some embodiments, a non-transitory computer-readable storage medium having stored thereon computer executable instructions for performing traffic shaping is provided. The instructions, when executed by a first network device, cause the computing device to be operable for: receiving, by the first network device, a message from a second network device with an indication that the first network device is to adjust a data rate of data being received by the first network device, wherein the first network device includes a first buffer space that is greater than a second buffer space of the second network device; determining, by the first network device, a set of computing devices connected to the second network device based on receiving the indication; defining, by the first network device, a set of first data rates to use to send data to respective computing devices in the set of computing devices; and adjusting, by the first network device, a second data rate of received data to send the received data through the second network device to a computing device in the set of computing devices at a first data rate defined in the set of first data rates, wherein the first network device uses the first buffer space to perform the adjusting.

In some embodiments, receiving the message includes: receiving connection information for the set of computing devices; and using the connection information to define a respective first data rate to send data to each of the set of computing devices.

In some embodiments, defining the set of first data rates includes: determining a set of destination addresses for the set of computing devices; and associating the set of destination addresses with the set of first data rates, wherein each first data rate is associated with a destination address.

In some embodiments, the first network device is included in a set of first network devices, the second network device is included in a set of second network devices, and the set of first network devices and the set of second network devices are interconnected in a network, wherein a data rate of sending data from the set of first network devices to the set of second devices via the network is similar.

In some embodiments, adjusting the second data rate of the received data includes: receiving the data at the second data rate for a computing device in the set of computing devices; selecting first data rate for the computing device; and sending the data to the computing device through the second network device at first data rate.

In some embodiments, a first network device includes: one or more computer processors; and a computer-readable storage medium comprising instructions for controlling the one or more computer processors to be operable for: receiving, by the first network device, a message from a second network device with an indication that the first network device is to adjust a data rate of data being received by the first network device, wherein the first network device includes a first buffer space that is greater than a second buffer space of the second network device; determining, by the first network device, a set of computing devices connected to the second network device based on receiving the indication; defining, by the first network device, a set of first data rates to use to send data to respective computing devices in the set of computing devices; and adjusting, by the first network device, a second data rate of received data to send the received data through the second network device to a computing device in the set of computing devices at a first data rate defined in the set of first data rates, wherein the first network device uses the first buffer space to perform the adjusting.

System

Figure 7:
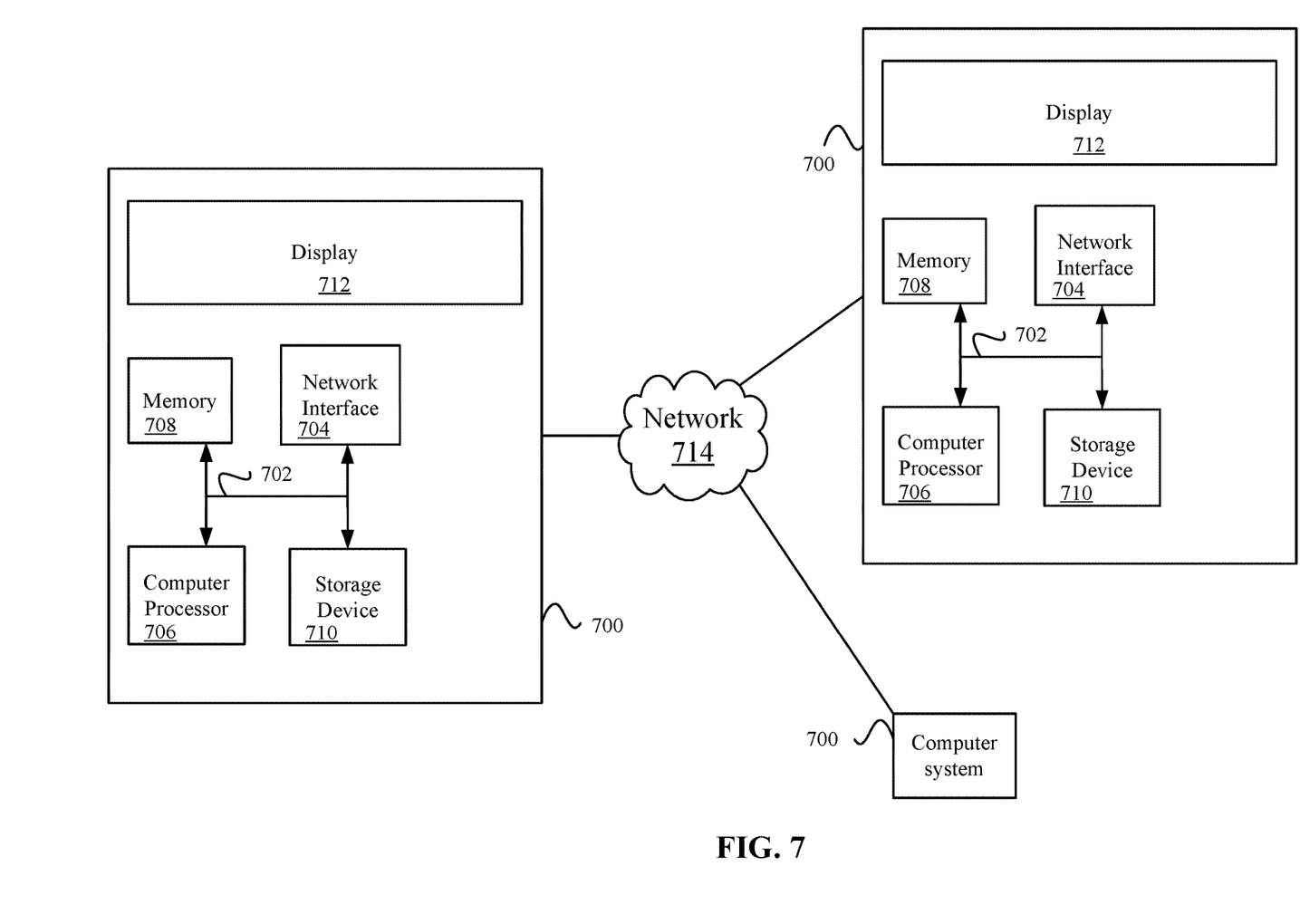
FIG. 7 illustrates an example of special purpose computer systems according to some embodiments.

FIG. 7 illustrates an example of special purpose computer systems 700 according to some embodiments. Computer system 700 includes a bus 702, network interface 704, a computer processor 706, a memory 708, a storage device 710, and a display 712.

Bus 702 may be a communication mechanism for communicating information. Computer processor 706 may execute computer programs stored in memory 708 or storage device 708. Any suitable programming language can be used to implement the routines of some embodiments including C, C++, Java, assembly language, etc. Different programming techniques can be employed such as procedural or object oriented. The routines can execute on a single computer system 700 or multiple computer systems 700. Further, multiple computer processors 706 may be used.

Memory 708 may store instructions, such as source code or binary code, for performing the techniques described above. Memory 708 may also be used for storing variables or other intermediate information during execution of instructions to be executed by processor 706. Examples of memory 708 include random access memory (RAM), read only memory (ROM), or both.

Storage device 710 may also store instructions, such as source code or binary code, for performing the techniques described above. Storage device 710 may additionally store data used and manipulated by computer processor 706. For example, storage device 710 may be a database that is accessed by computer system 700. Other examples of storage device 710 include random access memory (RAM), read only memory (ROM), a hard drive, a magnetic disk, an optical disk, a CD-ROM, a DVD, a flash memory, a USB memory card, or any other medium from which a computer can read.

Memory 708 or storage device 710 may be an example of a non-transitory computer-readable storage medium for use by or in connection with computer system 700. The non-transitory computer-readable storage medium contains instructions for controlling a computer system 700 to be configured to perform functions described by some embodiments. The instructions, when executed by one or more computer processors 706, may be configured to perform that which is described in some embodiments.

Computer system 700 includes a display 712 for displaying information to a computer user. Display 712 may display a user interface used by a user to interact with computer system 700.

Computer system 700 also includes a network interface 704 to provide data communication connection over a network, such as a local area network (LAN) or wide area network (WAN). Wireless networks may also be used. In any such implementation, network interface 704 sends and receives electrical, electromagnetic, or optical signals that carry digital data streams representing various types of information.

Computer system 700 can send and receive information through network interface 704 across a network 714, which may be an Intranet or the Internet. Computer system 700 may interact with other computer systems 700 through network 714. In some examples, client-server communications occur through network 714. Also, implementations of some embodiments may be distributed across computer systems 700 through network 714.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments, and are presented to illustrate the flexibility and advantages of some embodiments as defined by the following claims. Based on the above disclosure and the following claims, other arrangements, embodiments, implementations and equivalents may be employed without departing from the scope hereof as defined by the claims.

What is claimed is:

1. A method for performing traffic shaping, the method comprising:
    receiving, by a first network device, a message from a second network device with an indication that the first network device is to adjust a data rate of data being received by the first network device, wherein the first network device includes a first buffer space that is greater than a second buffer space of the second network device;
    determining, by the first network device, a set of computing devices connected to the second network device based on receiving the indication;
    defining, by the first network device, a set of first data rates to use to send data to respective computing devices in the set of computing devices; and
    adjusting, by the first network device, a second data rate of received data to send the received data through the second network device to a computing device in the set of computing devices at a first data rate defined in the set of first data rates, wherein the first network device uses the first buffer space to perform the adjusting.

2. The method of claim 1, wherein:
    each of the set of computing devices is associated with a first data rate in the set of first data rates, and
    the first data rate is selected based on data being sent to a respective computing device in the set of computing devices.

3. The method of claim 1, wherein receiving the message comprises:
    receiving connection information for the set of computing devices; and
    using the connection information to define a respective first data rate to send data to each of the set of computing devices.

4. The method of claim 1, wherein receiving the message comprises:
    receiving connection information for a subnet;
    determining a number of computing devices in the subnet based on the connection information; and
    using the number of computing devices to define a first data rate to send data to each of the set of computing devices.

5. The method of claim 4, wherein:
    the connection information for the subnet is a prefix of the subnet; and
    the prefix is used to define a first data rate to send data to each of the set of computing devices with connection information for each of the set of computing device.

6. The method of claim 1, wherein the set of computing devices are at least a first hop away from the second network device and are at least a second hop away from the adjusting of the first data rate of received data that is being performed on the first network device.

7. The method of claim 1, wherein defining the set of first data rates comprises:
    determining a set of destination addresses for the set of computing devices; and
    associating the set of destination addresses with the set of first data rates, wherein each first data rate is associated with a destination address.

8. The method of claim 1, wherein:
    the first network device is included in a set of first network devices,
    the second network device is included in a set of second network devices, and
    the set of first network devices and the set of second network devices are interconnected in a network, wherein a data rate of sending data from the set of first network devices to the set of second devices via the network is similar.

9. The method of claim 7, wherein:
    the set of first network devices and the set of second network devices form a leaf-spine network in which the set of first network devices and the set of second network devices are connected in a mesh.

10. The method of claim 1, wherein adjusting the second data rate of the received data comprises:
    receiving the data at the second data rate for a computing device in the set of computing devices;

selecting first data rate for the computing device; and sending the data to the computing device through the second network device at first data rate.

11. The method of claim 10, wherein adjusting the second data rate of the received data comprises:

buffering at least part of the data in the first buffer space until sending the at least the part of the data at the first data rate to the computing device in the set of computing devices.

12. The method of claim 10, wherein adjusting the second data rate of the received data comprises:

inspecting a packet of the data for a destination address; and selecting the first data rate in the set of first data rates that is defined for the destination address.

13. The method of claim 1, wherein:

the first network device comprises a first switch with the first buffer space, the second network device comprises a second switch with the second buffer space, and the set of computing devices comprise a set of servers that are running an application.

14. The method of claim 1, wherein data is received from a client that sends the data for an application that is running on the computing device in the set of computing devices.

15. A non-transitory computer-readable storage medium having stored thereon computer executable instructions for performing traffic shaping, wherein the instructions, when executed by a first network device, cause the computing device to be operable for:

receiving, by the first network device, a message from a second network device with an indication that the first network device is to adjust a data rate of data being received by the first network device, wherein the first network device includes a first buffer space that is greater than a second buffer space of the second network device;

determining, by the first network device, a set of computing devices connected to the second network device based on receiving the indication;

defining, by the first network device, a set of first data rates to use to send data to respective computing devices in the set of computing devices; and adjusting, by the first network device, a second data rate of received data to send the received data through the second network device to a computing device in the set of computing devices at a first data rate defined in the set of first data rates, wherein the first network device uses the first buffer space to perform the adjusting.

16. The non-transitory computer-readable storage medium of claim 15, wherein receiving the message comprises:

receiving connection information for the set of computing devices; and using the connection information to define a respective first data rate to send data to each of the set of computing devices.

17. The non-transitory computer-readable storage medium of claim 15, wherein defining the set of first data rates comprises:

determining a set of destination addresses for the set of computing devices; and associating the set of destination addresses with the set of first data rates, wherein each first data rate is associated with a destination address.

18. The non-transitory computer-readable storage medium of claim 15, wherein:

the first network device is included in a set of first network devices, the second network device is included in a set of second network devices, and the set of first network devices and the set of second network devices are interconnected in a network, wherein a data rate of sending data from the set of first network devices to the set of second devices via the network is similar.

19. The non-transitory computer-readable storage medium of claim 15, wherein adjusting the second data rate of the received data comprises:

receiving the data at the second data rate for a computing device in the set of computing devices;

selecting first data rate for the computing device; and sending the data to the computing device through the second network device at first data rate.

20. A first network device comprising:

one or more computer processors; and a computer-readable storage medium comprising instructions for controlling the one or more computer processors to be operable for:

receiving, by the first network device, a message from a second network device with an indication that the first network device is to adjust a data rate of data being received by the first network device, wherein the first network device includes a first buffer space that is greater than a second buffer space of the second network device;

determining, by the first network device, a set of computing devices connected to the second network device based on receiving the indication;

defining, by the first network device, a set of first data rates to use to send data to respective computing devices in the set of computing devices; and adjusting, by the first network device, a second data rate of received data to send the received data through the second network device to a computing device in the set of computing devices at a first data rate defined in the set of first data rates, wherein the first network device uses the first buffer space to perform the adjusting.

* * * * *